United States Patent
Lin

(12) 
(10) Patent No.: US 10,673,602 B2
(45) Date of Patent: Jun. 2, 2020

(54) METHOD AND APPARATUS FOR IMPROVEMENT OF TDD INTER-BAND CARRIER AGGREGATION IN A WIRELESS COMMUNICATION SYSTEM

(71) Applicant: INNOVATIVE SONIC CORPORATION, Taipei (TW)

(72) Inventor: Ko-Chiang Lin, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 397 days.

(21) Appl. No.: 13/630,188

(22) Filed: Sep. 28, 2012

(65) Prior Publication Data

US 2013/0083708 A1    Apr. 4, 2013

Related U.S. Application Data

(60) Provisional application No. 61/541,499, filed on Sep. 30, 2011.

(51) Int. Cl.
*H04L 5/14* (2006.01)
*H04L 1/18* (2006.01)
*H04W 72/04* (2009.01)

(52) U.S. Cl.
CPC ............. *H04L 5/14* (2013.01); *H04L 1/1854* (2013.01); *H04L 1/1812* (2013.01); *H04W 72/04* (2013.01)

(58) Field of Classification Search
CPC ................................ H04L 5/14; H04L 1/1854
USPC .......................... 370/252, 280, 328, 329, 336
See application file for complete search history.

(56) References Cited

U.S. PATENT DOCUMENTS

| | | | | |
|---|---|---|---|---|
| 2007/0245201 A1* | 10/2007 | Sammour | ............. | H04L 1/1628 714/748 |
| 2008/0095109 A1* | 4/2008 | Malladi | ................. | H04L 1/1858 370/330 |
| 2009/0201825 A1* | 8/2009 | Shen | ...................... | H04L 1/0026 370/252 |
| 2009/0235139 A1* | 9/2009 | Park | ...................... | H04L 1/1819 714/750 |
| 2010/0034158 A1* | 2/2010 | Meylan | ................. | H04W 24/10 370/329 |

(Continued)

FOREIGN PATENT DOCUMENTS

| | | |
|---|---|---|
| CN | 102045763 A | 5/2011 |
| WO | 2010074498 A2 | 7/2010 |

OTHER PUBLICATIONS

U.S. Appl. No. 61/499,382, filed Jun. 2011, Park; Sung Jun.*

(Continued)

*Primary Examiner* — Jael M Ulysse
(74) *Attorney, Agent, or Firm* — Blue Capital Law Firm, P.C.

(57) ABSTRACT

A method and apparatus for TDD inter-band carrier aggregation in a wireless communication system includes performing aggregating multiple cells with different TDD UL-DL configurations, transmitting a PUSCH transmission on a first cell, the subframe for HARQ feedback reception for the PUSCH in a first cell colliding with a UL subframe in a second cell, and performing one of setting the corresponding HARQ feedback to ACK, flushing the corresponding HARQ buffer, and changing the corresponding HARQ feedback subframe for the PUSCH to another subframe.

16 Claims, 9 Drawing Sheets

(56) References Cited

U.S. PATENT DOCUMENTS

| | | | | |
|---|---|---|---|---|
| 2010/0042881 A1* | 2/2010 | Wong | H04L 1/1692 | 714/748 |
| 2010/0091725 A1* | 4/2010 | Ishii | H04W 72/04 | 370/329 |
| 2010/0091726 A1* | 4/2010 | Ishii | H04L 1/18 | 370/329 |
| 2010/0157927 A1* | 6/2010 | Mochizuki | H04L 1/1685 | 370/329 |
| 2010/0189032 A1* | 7/2010 | Chen | H04B 1/7143 | 370/328 |
| 2010/0195629 A1* | 8/2010 | Chen | H04L 1/1664 | 370/336 |
| 2010/0278123 A1* | 11/2010 | Fong | H04B 7/2656 | 370/329 |
| 2010/0331037 A1* | 12/2010 | Jen | H04W 52/146 | 455/522 |
| 2011/0141991 A1* | 6/2011 | Gao | H04L 1/1896 | 370/329 |
| 2011/0165906 A1* | 7/2011 | Papasakellariou | H04L 1/1692 | 455/522 |
| 2011/0170489 A1* | 7/2011 | Han | H04B 7/0671 | 370/328 |
| 2011/0176461 A1* | 7/2011 | Astely | H04B 7/2656 | 370/280 |
| 2011/0216676 A1* | 9/2011 | Li | H04L 1/1812 | 370/281 |
| 2011/0243066 A1* | 10/2011 | Nayeb Nazar | H04L 1/007 | 370/328 |
| 2011/0249578 A1* | 10/2011 | Nayeb Nazar | H04L 1/0027 | 370/252 |
| 2012/0034927 A1* | 2/2012 | Papasakellariou | H04L 1/1861 | 455/450 |
| 2012/0069802 A1* | 3/2012 | Chen | H04L 5/001 | 370/329 |
| 2012/0076028 A1* | 3/2012 | Ko | H04L 1/0026 | 370/252 |
| 2012/0082079 A1* | 4/2012 | Luo | H04L 1/1671 | 370/311 |
| 2012/0106407 A1* | 5/2012 | Papasakellariou | H04L 5/001 | 370/280 |
| 2012/0113827 A1* | 5/2012 | Yamada | H04L 1/0031 | 370/252 |
| 2012/0113904 A1* | 5/2012 | Anderson | H04W 72/042 | 370/329 |
| 2012/0207040 A1* | 8/2012 | Comsa | H04W 72/1215 | 370/252 |
| 2012/0257519 A1* | 10/2012 | Frank | H04L 5/0035 | 370/252 |
| 2012/0327821 A1* | 12/2012 | Lin | H04W 72/048 | 370/280 |
| 2013/0039193 A1* | 2/2013 | Yin | H04W 72/0486 | 370/252 |
| 2013/0039231 A1* | 2/2013 | Wang | H04W 72/10 | 370/280 |
| 2013/0044651 A1* | 2/2013 | Wang | H04W 72/0406 | 370/280 |
| 2013/0044654 A1* | 2/2013 | Chen | H04L 5/0023 | 370/280 |
| 2013/0083736 A1* | 4/2013 | Yin | H04W 72/0446 | 370/329 |
| 2013/0083737 A1* | 4/2013 | Earnshaw | H04L 1/1887 | 370/329 |
| 2013/0294423 A1* | 11/2013 | Wang | H04N 21/2365 | 370/336 |

OTHER PUBLICATIONS

3GPP TSG RAN WG1 Meeting#66, Athens, Greece, Aug. 22-26, 2011 (R1-112349).

Office Action on corresponding TW Patent Application No. 101135765 dated Dec. 31, 2014.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 5

METHOD AND APPARATUS FOR IMPROVEMENT OF TDD INTER-BAND CARRIER AGGREGATION IN A WIRELESS COMMUNICATION SYSTEM

FIELD

This disclosure generally relates to wireless communication networks, and more particularly, to a method and apparatus for improvement of TDD inter-band carrier aggregation in a wireless communication, system.

BACKGROUND

With the rapid rise in demand for communication of large amounts of data to and from mobile communication devices, traditional mobile voice communication networks are evolving into networks that communicate with Internet. Protocol (IP) data packets, Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus for performing TDD inter-band carrier aggregation in a wireless communication system includes performing aggregating multiple cells with different. TDD UL-DL configurations, transmitting a PUSCH transmission on a first cell, the subframe for HARQ feedback reception for the PUSCH in a first cell colliding with a UL subframe in a second cell, and performing one of setting the corresponding HARQ feedback to ACK, flushing the corresponding HARQ buffer, and changing the corresponding HARQ feedback subframe for the PUSCH to another subframe.

BRIEF DESCRIPTION OF THE DRAWINGS

FIG. 5 illustrates a table of different TDD UL-DL configurations.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including. Document Nos. 3GPP TS 36.213 V10.2.0, "E-UTRA Physical layer procedures (Release 10)"; 3GPP TS 36.211, V10.2.0, "E-UTRA Physical channels and modulation"; and R1-112082, "Discussion on design principles for additional carrier types", Ericsson, ST-Ericsson. The standards and documents listed above are hereby expressly incorporated herein.

Figure 1:
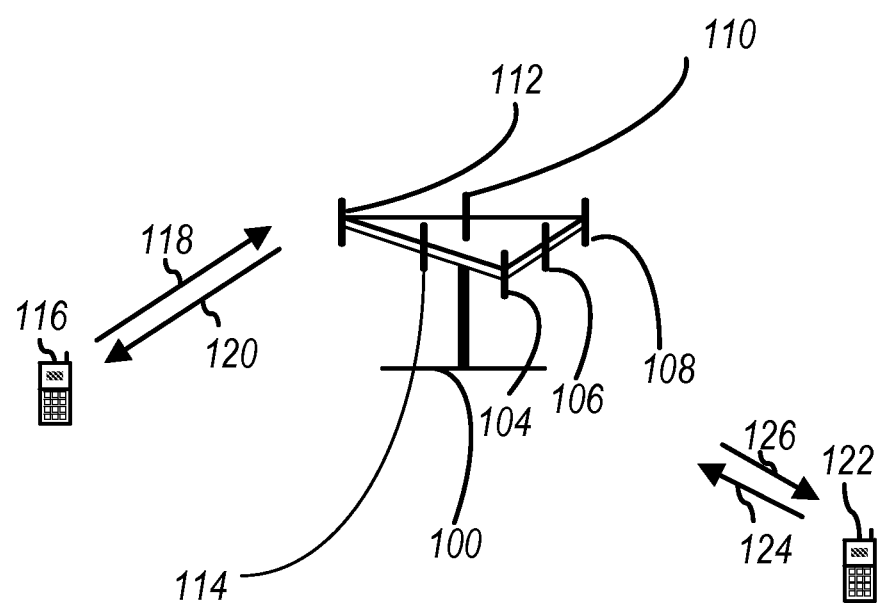
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station, or base station used for communicating with the terminals and may also be referred to as an access point, a Node B, base station, an enhanced base station, an eNodeB, or some other terminology. An access terminal (AT) may also be called user equipment (UE), a wireless communication device, terminal, access terminal or some other terminology.

Figure 2:
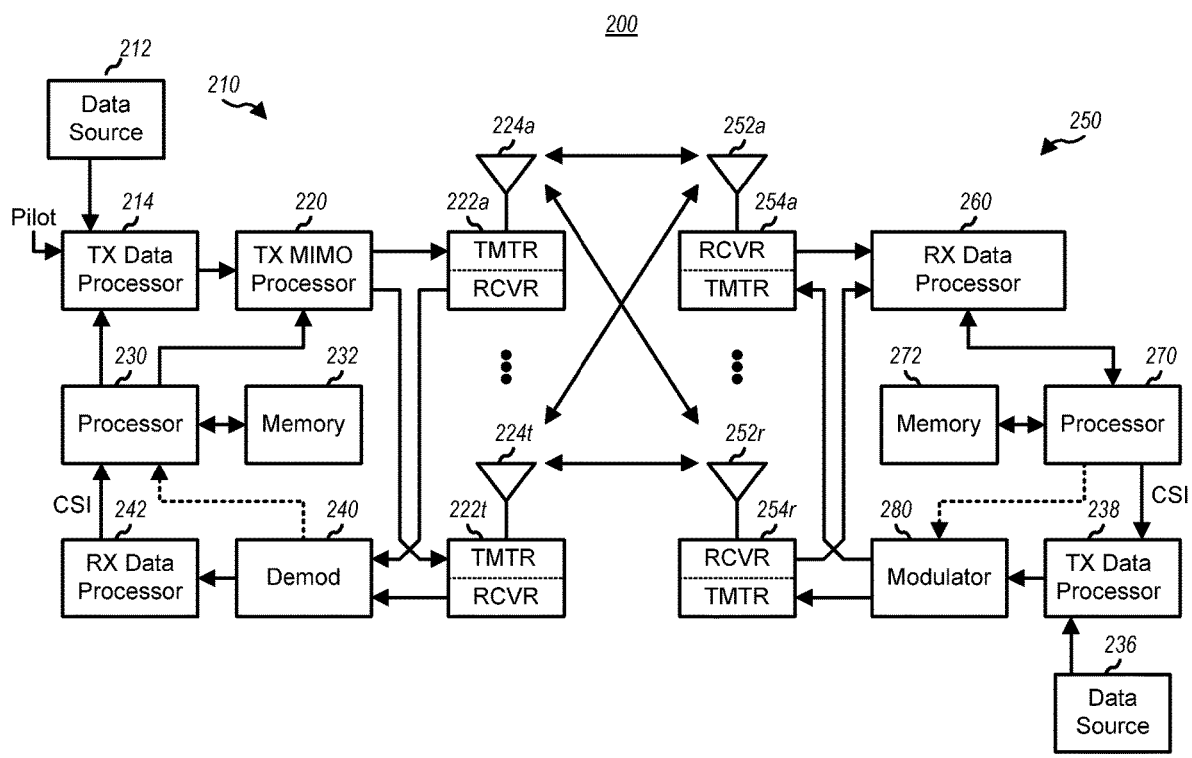
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in as MINO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
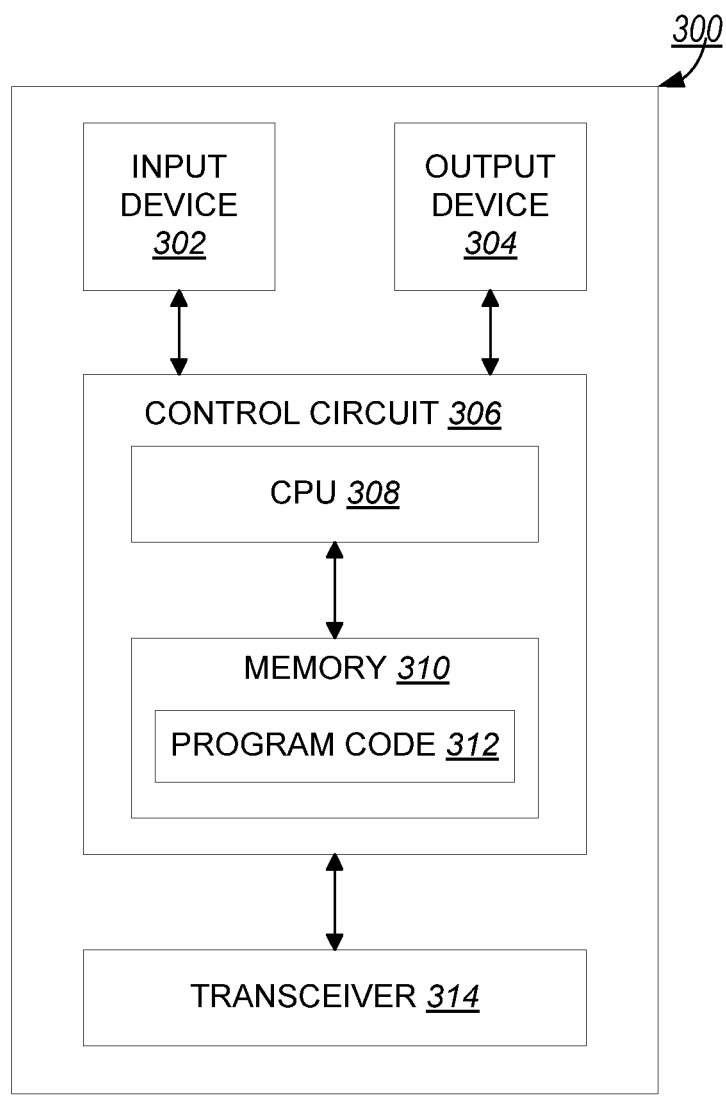
FIG. 3 is a functional, block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
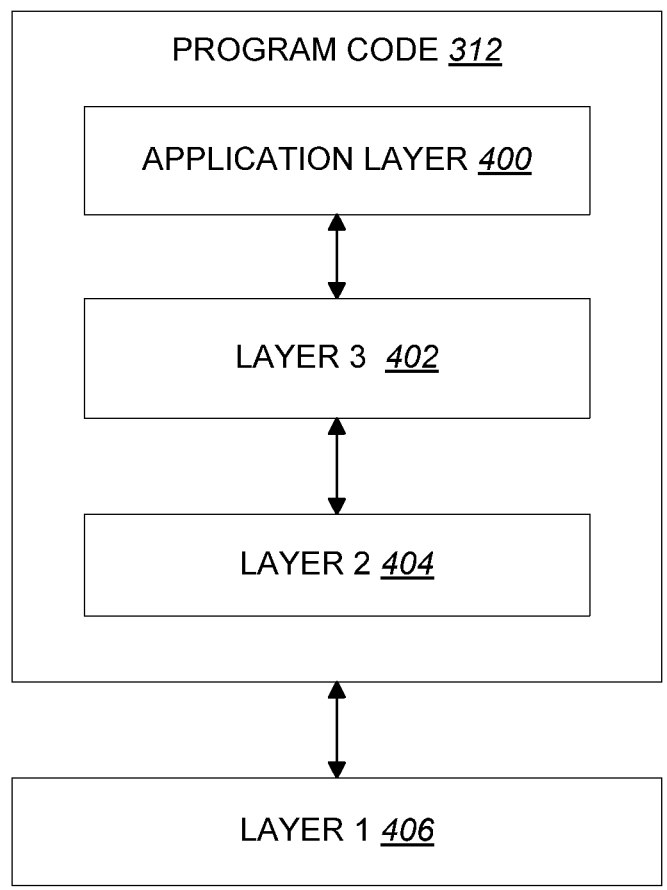
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Carrier Aggregation (CA) improves the data rate of UE by aggregating multiple cells for parallel transmission and reception. CA may be enhanced by allowing different Time Division Duplex (TDD) uplink (UL)-downlink (DL) configuration for inter-band carrier aggregation. With such an enhancement, the system can coexist with the current 3G network well and easier for deployment targeting for different needs.

Because different TDD UL-DL configurations can be aggregated, it is possible that in some subframe(s) the subframe type is different, e.g., in one cell the subframe may belong to DL subframe while in another cell the subframe may belong to UL subframe, which can be considered as conflict subframe. Accordingly, the questions of whether or not TDD UE supporting different UL-DL configuration is allowed to perform transmission (TX) and reception (RX) simultaneously provides several alternatives as follows:

No simultaneous TX and RX
        UL/DL type of conflict subframe is fixed, e.g., following Primary Cell (PCell)
        UL/DL type of conflict subframe is changeable
            configurable through Radio Resource Control (RRC)
            dynamically changed through. Physical Downlink Control Channel (PDCCH)
    Simultaneous TX and RX Conflict subframe can coexist as simultaneous TX and RX is supported.

For the case of no simultaneous TX and RX, one conflict subframe is considered either UL or DL and the above alternatives give different rules to make a decision. For example, for the case of following Pcell, the subframe is considered the same UL/DL type as that of PCell. For the case of configurable through RRC, each subframe is indicated by RRC configuration about if it belongs to UL or DL. For the case of dynamically changed through PDCCH, each subframe is dynamically determined by scheduling about if it belongs to UL or DL. Referring to FIG. 5, there are currently seven different TDD UL-DL configurations.

The Hybrid Automatic Repeat and reQuest (HARQ) timing association for DL control signalling (e.g., PDCCH UL grant, HARQ feedback) and Physical Uplink Shared Channel (PUSCH) UL transmission is defined in 3GPP TS 36.213 V10.2.0, "E-UTRA Physical layer procedures (Release 10)". When a new transmission fails, retransmission can be performed based on the following DL control signalling, e.g., UL grant for retransmission or HARQ feedback is set to Negative Acknowledgement (NACK) for non-adaptive retransmission. When corresponding HARQ feedback is set to Acknowledgement (ACK), the following PUSCH transmission is suspended.

Figure 6:
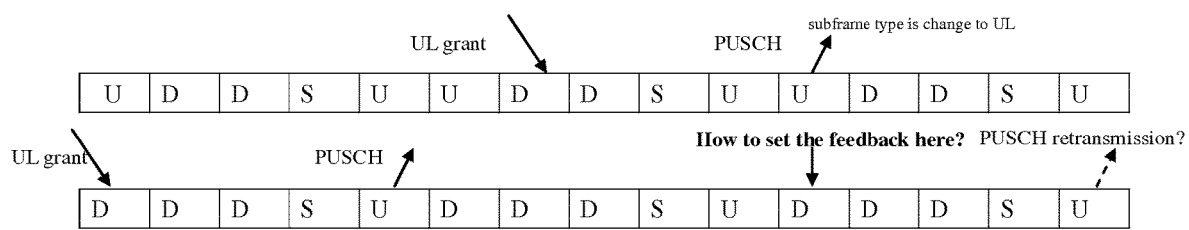
FIG. 6 is a diagram illustrating setting proper feedback for uplink transmission.

Assuming that simultaneous TX and RX are not supported, if a PUSCH is successfully received by eNB, eNB would have to send an ACK so that the following retransmission is suspended. If the subframe for the corresponding HARQ feedback reception collides with UL subframe of another cell, UL transmission in the same subframe cannot be transmitted because simultaneous TX and RX are not supported. The PUSCH would have to be delayed until the next possible transmission occasion. On the contrary, from UE point of view, if the UE is waiting for the HARQ feedback for a UL transmission while the subframe type of subframe of HARQ feedback reception is changed to UL e.g., through RRC signalling or dynamic scheduling, the HARQ feedback may not be set correctly and undesired UL retransmission might be sent due to the wrong HARQ feedback. An example is shown in FIG. 6 for dynamic scheduling case. Such an issue can occur when the subframe for HARQ feedback reception for PUSCH in one cell collides with a UL subframe in another cell According to the above, the following UL transmission may be on-hold or forbidden at least temporarily due to lack of proper downlink control signalling when there is subframe type change and the subframe for HARQ feedback reception is changed to UL. One solution is to set the corresponding HARQ feedback to ACK when the concerned case occurs, e.g. when the subframe type of the subframe for HARQ feedback reception is set to UL. Or alternatively, flush the corresponding HARQ buffer in the concerned case. The third option is that the subframe for HARQ feedback reception/PDCCH UL grant reception is changed to another subframe. One implementation is to follow the timing association of UL-DL configuration of cell who has UL subframe collides with the HARQ feedback of the concerned cell, or alternatively to follow the timing association of UL-DL configuration of cell with more UL subframes. For example, in FIG. 6, the HARQ feedback reception/PDCCH UL grant reception can be changed to two subframes before the original one, i.e., changed to the special subframe before the original subframe.

Figure 7:
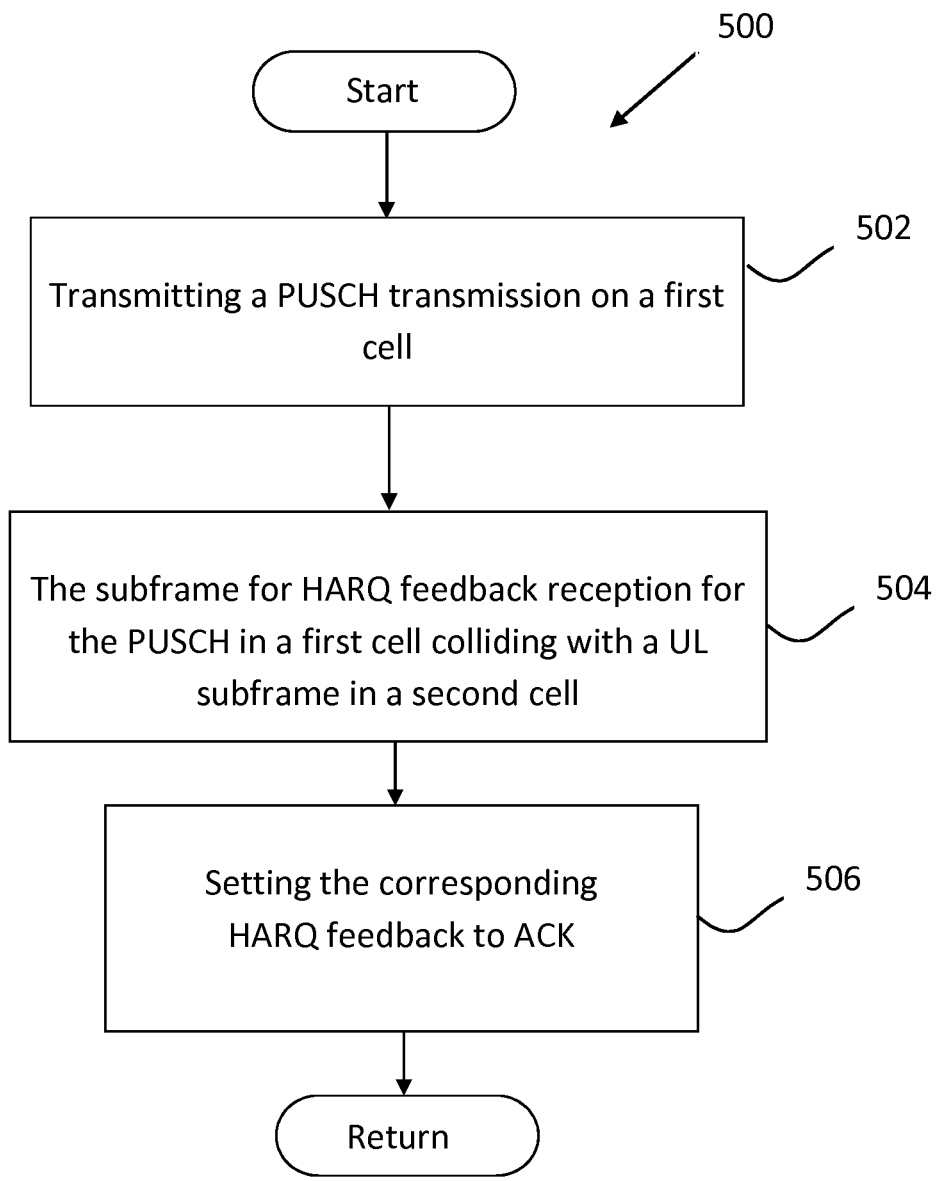
FIG. 7 illustrates a method according to one exemplary embodiment.

According to one embodiment shown in FIG. 7, a method 500 of TDD inter-band carrier aggregation in a wireless communication system comprises aggregating multiple cells with different TDD UL-DL configurations (not shown) and transmitting a PUSCH transmission on a first cell (block 502). The method 500 further comprises the subframe for HARQ feedback reception for the PUSCH in a first cell colliding with a UL subframe in a second cell (block 504). The method 500 then comprises setting the corresponding HARQ feedback to ACK (block 506).

Referring back to FIGS. 3 and 4, the HE 300 includes a program code 312 stored in memory 310. In one embodiment, the CPU 308 could execute the program code 312 to perform the method 500 by aggregating multiple cells with different TDD UL-DL configurations, transmitting a PUSCH transmission on a first cell, wherein the subframe for HARQ feedback reception for the PUSCH in a first cell collides with a UL subframe in a second cell, and setting the corresponding HARQ feedback to ACK. In addition, the CPU 308 can execute the program code 312 to perform all of the above-described actions and steps or others described herein.

According to one embodiment, the method 500 may further include the UE performing UL transmission on the second cell.

According to another embodiment, the method 500 may further include the subframe type of the conflict subframe for the corresponding HARQ feedback reception for PUSCH being set to UL. The subframe type may be changed due to dynamic scheduling, e.g., receiving a PDCCH for UL grant. The subframe type may be changed due to RRC configuration. According to another embodiment, simultaneous transmission and reception is not supported.

According to another embodiment, the method 500 may further include the corresponding HARQ reception being received on a first cell. In the subframe for the HARQ feedback reception, there is UL subframe on a second cell.

Figure 8:
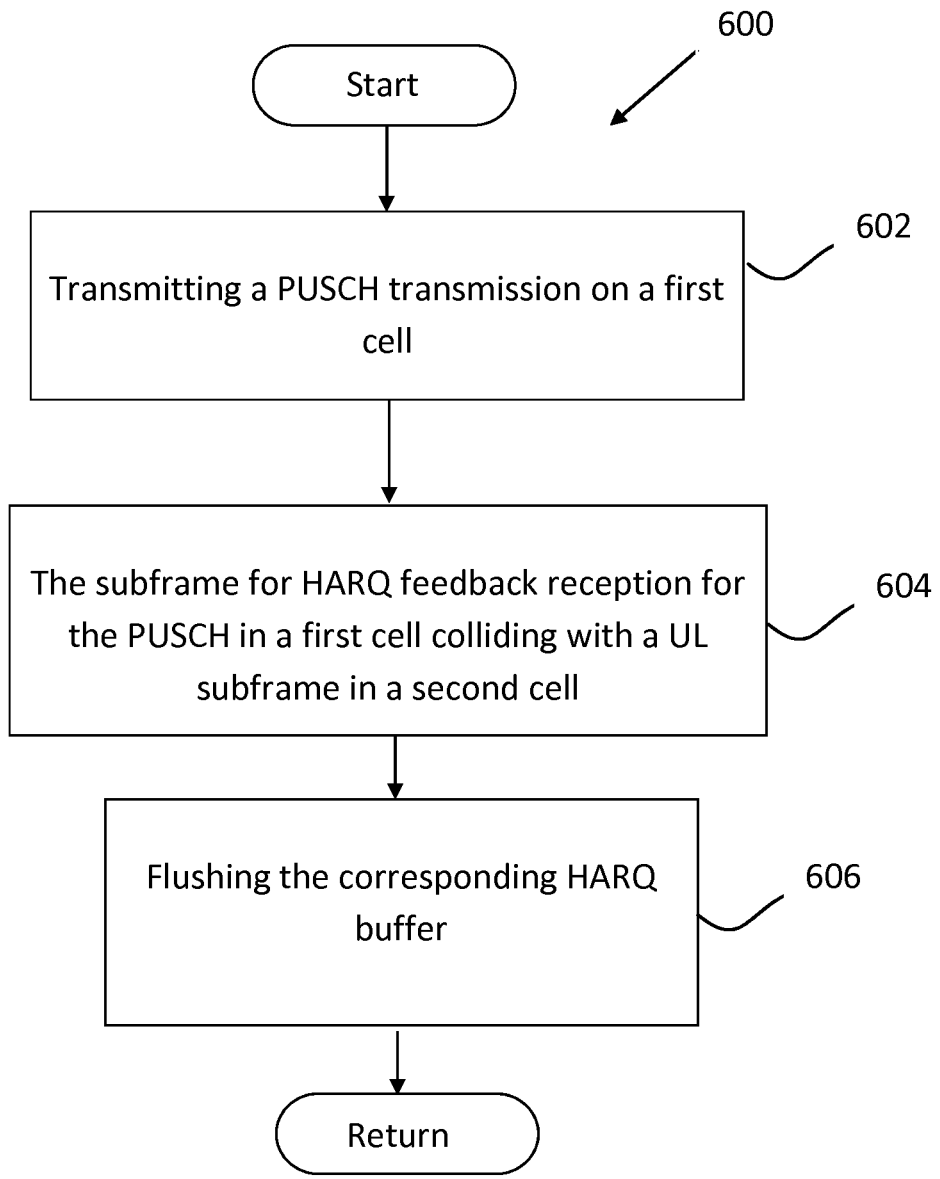
FIG. 8 illustrates a method according to another exemplary embodiment.

According to another embodiment shown in FIG. 8, a method 600 of TDD inter-band carrier aggregation in a wireless communication system comprises aggregating multiple cells with different TDD UL-DL configurations (not shown) and transmitting a PUSCH transmission on a first cell (block 602). The method 600 further comprises the subframe for HARQ feedback reception for the PUSCH in a first cell colliding with a UL subframe in a second cell (block 604). The method 600 then flushes the corresponding HARQ buffer (block 606).

Referring back to FIGS. 3 and 4, the UE 300 includes a program code 312 stored in memory 310. In one embodiment, the CPU 308 could execute the program code 312 to perform the method 600 by aggregating multiple cells with different TDD UL-DL configurations, transmitting a PUSCH transmission on a first cell, wherein the subframe for HARQ feedback reception for the PUSCH in a first cell collides with a UL subframe in a second cell, and flushing the corresponding HARQ buffer. In addition, the CPU 308 can execute the program code 312 to perform all of the above-described actions and steps or others described herein.

According to another embodiment, the method 600 further includes the UE performing UL transmission on the second cell.

According to another embodiment, the method 600 may further include the subframe type of the conflict subframe for the corresponding HARQ feedback reception is set to UL. The subframe type is changed due to dynamic scheduling, e.g. receiving a PDCCH for UL grant. The subframe type is changed due to RRC configuration. According to another embodiment, simultaneous transmission and reception is not supported.

According to another embodiment, the method 600 may further include the corresponding HARQ reception is received on a first cell. In the subframe for the HARQ feedback reception, there is UL subframe on a second cell.

Figure 9:
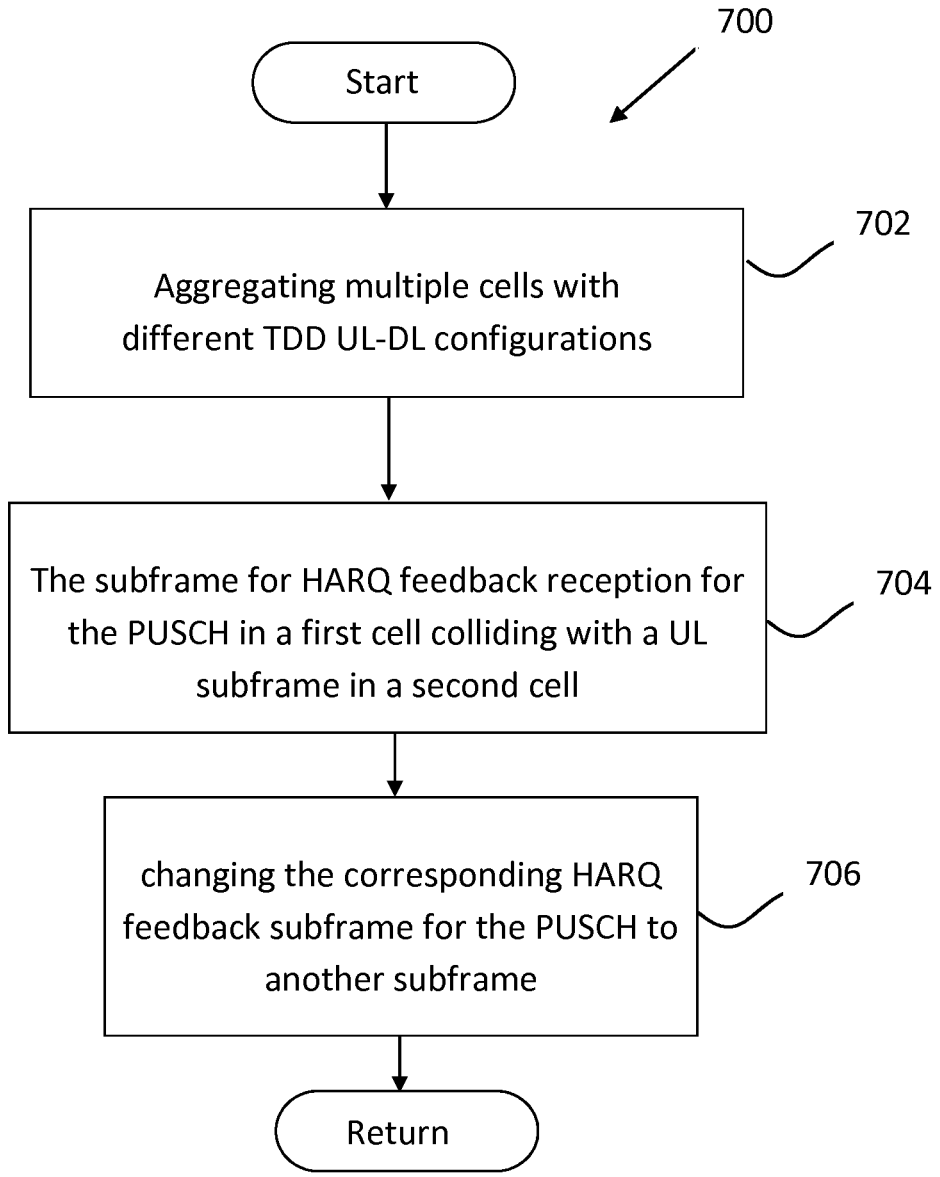
FIG. 9 illustrates a method according to another exemplary embodiment.

According to another embodiment shown in FIG. 9, a method 700 of TDD inter-band carrier aggregation in a wireless communication system comprises aggregating multiple cells with different TDD UL-DL configurations (block 702), and the subframe for HARQ feedback reception for PUSCH in a first cell colliding with a UL subframe in a second cell (block 704). The method 700 then includes changing the corresponding HARQ feedback subframe for the PUSCH to another subframe (block 706).

Referring back to FIGS. 3 and 4, the UE 300 includes a program code 312 stored in memory 310. In one embodiment, the CPU 308 could execute the program code 312 to perform the method 700 by aggregating multiple cells with different TDD UL-DL configurations, wherein the subframe for HARQ feedback reception for PUSCH in a first cell collides with a UL subframe in a second cell, and changing the corresponding HARQ feedback subframe for the PUSCH to another subframe. In addition, the CPU 308 can execute the program code 312 to perform all of the above-described actions and steps or others described herein.

According to another embodiment, the method 700 includes the new subframe for HARQ feedback being determined according to the UL-DL configuration of the second cell.

According to another embodiment, the method 700 includes the new subframe for HARQ feedback being determined according to the cell with the UL-DL configuration of the most number of UL subframes.

According to another embodiment, simultaneous transmission and reception is not supported according to the method 700.

According, to any of the above methods, PUSCH scheduling is more efficient. Furthermore, erroneous retransmission can be avoided.

Various aspects of the disclosure have been described above it should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise, a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium, known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of Time Division Duplex (TDD) inter-band carrier aggregation in a wireless communication system comprising:
   aggregating, at a UE (User Equipment), multiple cells with different Time Division Duplex (TDD) uplink (UL)-downlink (DL) configurations;
   transmitting, by the UE, an uplink Physical Uplink Share Channel (PUSCH) transmission on a first cell, wherein the UE expects to receive a downlink subframe on the first cell for receiving a Hybrid Automatic Repeat and reQuest (HARQ) feedback for the uplink PUSCH transmission on the first cell, wherein the UE decides whether to perform retransmission for the uplink PUSCH transmission based on the HARQ feedback, and wherein the HARQ feedback is set to Acknowledgement (ACK) if a base station successfully decodes the uplink PUSCH transmission;
   setting, by the UE, as the UE fails to receive the HARQ feedback due to a UL subframe in a second cell, the HARQ feedback parameter to ACK for the uplink PUSCH transmission without receiving the HARQ feedback so as to suspend retransmission for the PUSCH if the downlink subframe on the first cell for receiving the HARQ feedback collides with the UL subframe in the second cell; and
   suspending, at the UE, a following retransmission of the PUSCH.

2. The method of claim 1, further comprising performing UL transmission on the second cell when performing one of setting the corresponding HARQ feedback to ACK and flushing the corresponding HARQ buffer.

3. The method of claim 1, wherein a subframe type of a conflict subframe for a corresponding HARQ feedback reception for PUSCH is set to UL when performing one of setting the corresponding HARQ feedback to ACK and flushing the corresponding HARQ buffer.

4. The method of claim 3, wherein the subframe type is changed due to dynamic scheduling.

5. The method of claim 3, wherein the subframe type is changed due to Radio Resource Control (RRC) configuration.

6. The method of claim 1, wherein simultaneous transmission and reception is not supported.

7. The method of claim 1, wherein a corresponding HARQ reception is received on the first cell when performing one of setting the corresponding HARQ feedback to ACK and flushing the corresponding HARQ buffer.

8. The method of claim 7, wherein in the subframe for the HARQ feedback reception, there is UL subframe on the second cell when performing one of setting the corresponding HARQ feedback to ACK and flushing the corresponding HARQ buffer.

9. A communication device for use in a wireless communication system, the communication device comprising:
   a control circuit;
   a processor installed in the control circuit to control the control circuit;
   a memory installed in the control circuit and coupled to the processor;
   wherein the processor is configured to execute a program code stored in the memory to:
      aggregate multiple cells with different Time Division Duplex (TDD) uplink (UL)-downlink (DL) configurations;
      transmit, by the UE, an uplink Physical Uplink Share Channel (PUSCH) transmission on a first cell, wherein the UE expects to receive a downlink subframe on the first cell for receiving a Hybrid Automatic Repeat and reQuest (HARQ) feedback for the uplink PUSCH transmission on the first cell, wherein the UE decides whether to perform retransmission for the uplink PUSCH transmission based on the HARQ feedback, and wherein the HARQ feedback is set to Acknowledgement (ACK) if a base station successfully decodes the uplink PUSCH transmission;
      set, by the UE, as the UE fails to receive the HARQ feedback due to a UL subframe in a second cell, the HARQ feedback parameter to ACK for the uplink PUSCH transmission without receiving the HARQ feedback so as to suspend retransmission for the PUSCH if the downlink subframe on the first cell for receiving the HARQ feedback collides with the UL subframe in the second cell; and
      suspend a following retransmission of the PUSCH.

10. The communication device of claim 9, wherein the processor is further configured to execute the program code to perform UL transmission on the second cell when performing one of setting the corresponding HARQ feedback to ACK and flushing the corresponding HARQ buffer.

11. The communication device of claim 9, wherein a subframe type of a conflict subframe for a corresponding HARQ feedback reception for PUSCH is set to UL when performing one of setting the corresponding HARQ feedback to ACK and flushing the corresponding HARQ buffer.

12. The communication device of claim 11, wherein the subframe type is changed due to dynamic scheduling.

13. The communication device of claim 11, wherein the subframe type is changed due to RRC configuration.

14. The communication device of claim 9, wherein simultaneous transmission and reception is not supported.

15. The communication device of claim 9, wherein a corresponding HARQ reception is received on the first cell when performing one of setting the corresponding HARQ feedback to ACK and flushing the corresponding HARQ buffer.

16. The communication device of claim 15, wherein in the subframe for the HARQ feedback reception, there is UL subframe on the second cell when performing one of setting the corresponding HARQ feedback to ACK and flushing the corresponding HARQ buffer.

* * * * *